United States Patent
Honda et al.

(10) Patent No.: US 7,237,005 B2
(45) Date of Patent: Jun. 26, 2007

(54) JOB NETWORK SETUP METHOD, JOB NETWORK EXECUTION METHOD, JOB MANAGEMENT SYSTEM, MANAGEMENT TERMINAL AND PROGRAM

(75) Inventors: Masanori Honda, Kanagawa (JP); Takaki Kuroda, Tokyo (JP); Taro Inoue, Kanagawa (JP); Shigeru Miyake, Tokyo (JP); Shogo Mikami, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 623 days.

(21) Appl. No.: 10/412,092

(22) Filed: Apr. 10, 2003

(65) Prior Publication Data

US 2004/0049531 A1 Mar. 11, 2004

(30) Foreign Application Priority Data

Sep. 5, 2002 (JP) .............................. 2002-260449

(51) Int. Cl.
*G06F 15/16* (2006.01)
*G06F 9/46* (2006.01)

(52) U.S. Cl. ................ 709/205; 709/202; 718/101

(58) Field of Classification Search ................ 709/201, 709/210, 203, 220, 221, 202, 205, 212; 718/105, 718/100, 101; 717/162
See application file for complete search history.

(56) References Cited

U.S. PATENT DOCUMENTS

| | | | |
|---|---|---|---|
| 4,839,798 A | 6/1989 | Eguchi et al. | |
| 5,301,322 A | 4/1994 | Hamanaka et al. | |
| 5,465,380 A | 11/1995 | Hamanaka et al. | |
| 5,481,698 A | 1/1996 | Itoh et al. | |
| 5,564,109 A | 10/1996 | Snyder et al. | |
| 5,870,604 A | 2/1999 | Yamagishi | |
| 6,009,466 A * | 12/1999 | Axberg et al. | ............... 709/220 |
| 6,178,459 B1 * | 1/2001 | Sugiyama | ................... 709/238 |
| 6,184,996 B1 | 2/2001 | Gase | |
| 6,438,553 B1 | 8/2002 | Yamada | |
| 6,493,680 B2 * | 12/2002 | Logan et al. | .................. 705/34 |
| 6,573,910 B1 | 6/2003 | Duke et al. | |
| 6,606,165 B1 | 8/2003 | Barry et al. | |
| 6,618,566 B2 * | 9/2003 | Kujirai et al. | ................. 399/79 |
| 6,658,650 B1 * | 12/2003 | Bates | ......................... 717/127 |

(Continued)

FOREIGN PATENT DOCUMENTS

JP 05-012037 1/1993

(Continued)

OTHER PUBLICATIONS

Japan Patent Office (JPO) Decision of Rejection for JPO patent application JP2002-260449 (Feb. 14, 2007).

*Primary Examiner*—Rupal Dharia
*Assistant Examiner*—Brian J. Gillis
(74) *Attorney, Agent, or Firm*—Townsend and Townsend and Crew LLP

(57) ABSTRACT

A job network setup method in a job management system which controls execution of jobs according to a set job network and which allows setup for data transfer from a preceding job to a succeeding job comprises enabling specifying such that data can be transferred from the preceding job to the succeeding job by linking a standard output of the preceding job to a standard input of the succeeding job when setting the succeeding job in setup of the job network.

2 Claims, 13 Drawing Sheets

U.S. PATENT DOCUMENTS

| | | |
|---|---|---|
| 2001/0010055 A1 | 7/2001 | Hirabayashi |
| 2002/0002578 A1 | 1/2002 | Yamashita |
| 2002/0046238 A1 | 4/2002 | Estavillo et al. |
| 2002/0078183 A1 | 6/2002 | Helms |
| 2002/0184113 A1 | 12/2002 | Ono et al. |
| 2003/0090716 A1 | 5/2003 | Umebayashi |
| 2003/0145049 A1 | 7/2003 | Hirabayashi |
| 2003/0163507 A1* | 8/2003 | Chang et al. ............... 709/100 |
| 2003/0182438 A1 | 9/2003 | Tenenbaum |
| 2003/0200289 A1 | 10/2003 | Kemp et al. |
| 2004/0025092 A1 | 2/2004 | Babutzka et al. |

FOREIGN PATENT DOCUMENTS

| | | |
|---|---|---|
| JP | 07-234796 A | 9/1995 |
| JP | 08-044574 | 2/1996 |
| JP | 09-097203 A | 4/1997 |
| JP | 10-097437 A | 4/1998 |
| JP | 2001-282551 | 10/2001 |

* cited by examiner

JOB NETWORK SETUP METHOD, JOB NETWORK EXECUTION METHOD, JOB MANAGEMENT SYSTEM, MANAGEMENT TERMINAL AND PROGRAM

CROSS-REFERENCE TO RELATED APPLICATIONS

The present application claims priority from Japanese Patent Application No. 2002-260449 filed on Sep. 5, 2002, which is herein incorporated by reference.

BACKGROUND OF THE INVENTION

1. Field of the Invention

The present invention relates to a job network setup method, job network execution method, job management system, management terminal and program.

2. Description of the Related Art

The so-called job management system which executes jobs according to a set job network is publicly known and disclosed in Japanese Patent Application Laid-open (Kokai) Publications Nos. Hei5-12037, Hei8-44574 and 2001-282551.

In such a job management system, a user sets up the job network while viewing a setup screen, for example, as shown in FIG. 12.

The setup screen shown in FIG. 12 allows setup such that data is transferred from a preceding job to a succeeding job, and the user specifies a file name in a "Standard Output" setup option 64 in properties setting fields 54 of a preceding job A1 and specifies the same file name in a "Standard Input" setup option 63 in the properties setting field 55 of a succeeding job A2 as that specified in the "Standard Output" setup option 64. Note that the "standard output" here refers to a standard output available with operating systems such as UNIX® and MS-DOS® and a device used as a standard output destination by processes which are executed on an operating system. Note also that the "standard input" refers to a device used as a standard input destination by the process which is executed on an operating system.

With conventional job management systems, however, even if a file name is specified on the setup screen shown in FIG. 12, it has been necessary for the user to make available a file corresponding to the file name on the operating system. Additionally, since an enormous number of jobs are occasionally contained in a job network, it has been necessary for the user to bear a considerable burden from complicated tasks such as file name specification and files management.

Moreover, the job management system is often used in an environment in which a plurality of computers are connected over a network as shown in FIG. 13, and in this case a job network may be set up to include jobs executed on different computers. In order to transfer data between jobs in this environment, the user has had to bear a considerable burden associated with the job network setup such as setting up a job used exclusively to send data for transfer between jobs over the network and setting up middleware or other software if the job management system is not equipped with file transmission function.

Note that storage systems such as SAN (Storage Area Network) and NAS (Network Attached Storage) which are built for efficient storage use and other purposes are among recent examples of connection of a plurality of computers over a network. And, RAID (Redundant Array of Inexpensive Disks) management servers, database servers, file servers and the like are connected over a network for operation in a storage system for load distribution, improved availability and other purposes.

There are times when one wishes to make different jobs reference common environmental variables (which refer to character strings managed by the operating system and referenced by jobs, applications and batch files). In this case, environmental variables are set up in each computer, for example, by performing the steps shown in FIG. 14 if different jobs are executed in an environment as shown in FIG. 13.

(1) Create an environmental variable file ("Env001") on the operating system of a computer 10 and include, for example, the environmental variables' settings listed below in this file. Note that "COMPANY_NAME", "PRODUCT_NAME", "DB_NAME" and "BACKUP_ID" are environmental variables and what follows "=" in each of the variables is its setting in this example.

COMPANY_NAME=Hitachi
PRODUCT_NAME=HiCommand
DB_NAME=HiRDB
BACKUP_ID=32695

(2) Before executing a job network, send, for example, the environmental variable file "Env001" created in the computer 10 to computers 20, 30 and 40, in which individual jobs are executed, via a network 5.

(3) Specify "Env001" as the environmental variable file to be referenced by the jobs A1 and A2 and a job A3 when setting up the job network.

When performing the steps here, the user needs to manually set up the environmental variable file and send the file to the computers 20, 30 and 40 by job setup or by other methods in the case of conventional job management systems. Additionally, if the user wishes to make a succeeding job reference the environmental variables' settings after they are updated by a preceding job, it has been necessary for the user, for example, to handle cumbersome tasks such as setting up a job for sending the environmental variables' settings updated by the preceding job from the computer executing the preceding job to the computer executing the succeeding job after execution of the preceding job and before execution of the succeeding job.

As discussed above, an arrangement has been required in job management systems which allows the user to efficiently set up a job network.

SUMMARY OF THE INVENTION

It is therefore one object of the present invention to provide a job network setup method, job network execution method, job management system, management terminal and program.

In order to achieve the above and other objects, according to one aspect of the present invention there is provided a job network setup method in a job management system which controls execution of jobs according to a set job network and which allows setup for data transfer from a preceding job to a succeeding job, said method comprising enabling specifying such that data can be transferred from said preceding job to said succeeding job by linking a standard output of said preceding job to a standard input of said succeeding job when setting said succeeding job in setup of said job network.

According to another aspect of the present invention there is provided a job network execution method in a job management system which controls execution of jobs according to a set job network and which allows setup for data transfer from a preceding job to a succeeding job, said job management system allowing said data transfer from said preceding job to said succeeding job to be specified upon setup of said succeeding job in a job network setting, by linking a standard output of said preceding job which precedes said succeeding job to a standard input of said succeeding job, said job network execution method comprising when executing a job network which is set up such that said preceding job is executed by a first computer and that said succeeding job is executed by a second computer which is connected communicably to said first computer, said job network being specified such that data is transferred from said preceding job to said succeeding job by linking said standard output of said preceding job to said standard input of said succeeding job, sending by said first computer contents of said standard output of said preceding job to a third computer which is connected communicably to said first computer and said second computer, receiving by said third computer said contents of said standard output of said preceding job and sending them to said second computer, and receiving by said second computer said contents of said standard output of said preceding job and linking them to said standard input of said succeeding job.

According to yet another aspect of the present invention there is provided a job network execution method in a job management system which controls execution of jobs according to a set job network and which allows setup for data transfer from a preceding job to a succeeding job, said job management system allowing said data transfer from said preceding job to said succeeding job to be specified upon setup of said succeeding job in a job network setting, by linking a standard output of said preceding job which precedes said succeeding job to a standard input of said succeeding job, said job network execution method comprising, when executing a job network which is set up such that said preceding job is executed by a first computer and that said succeeding job is executed by a second computer which is connected communicably to said first computer, said job network being specified such that data is transferred from said preceding job to said succeeding job by linking said standard output of said preceding job to said standard input of said succeeding job, sending by said first computer contents of said standard output of said preceding job to said second computer, and receiving by said second computer said contents of said standard output of said preceding job and linking them to said standard input of said succeeding job.

According to further aspect of the present invention there is provided a job network setup method in a job management system which controls execution of jobs according to a set job network, said method comprising enabling specifying an environmental variable referenced in common by a plurality of jobs as an environmental variables to be referenced by said job.

According to yet another aspect of the present invention there is provided a job network execution method in a job management system which controls execution of jobs according to a set job network and which allows environmental variables commonly referenced by a plurality of jobs to be specified as environmental variables referenced by said jobs at the time of job setup during a job network setting, said job network execution method comprising, when executing said job network in which environmental variables commonly referenced by a plurality of jobs set up in said job network to which said succeeding jobs belong are specified as environmental variables referenced by said succeeding jobs, executing by a first computer said preceding job which precedes said succeeding job, executing said succeeding job by a second computer which is connected communicably to said first computer, sending by said first computer said environmental variables' settings updated as a result of execution of said preceding job to a third computer which is connected communicably to said first computer and said second computer, receiving by said third computer said updated environmental variables' settings and sending them to said second computer, and receiving by said second computer said environmental variables' settings and causing succeeding jobs to reference these settings during execution of said succeeding jobs.

According to yet another aspect of the present invention there is provided a job management system which controls execution of jobs according to a set job network and which allows setup for data transfer from a preceding job to a succeeding job, said system comprising means for instructing to specify such that data can be transferred from said preceding job to said succeeding job by linking a standard output of said preceding job to a standard input of said succeeding job when setting said succeeding job in setup of said job network.

According to yet another aspect of the present invention there is provided a job management system which controls execution of jobs according to a set job network, said system comprising means for instructing to specify an environmental variable commonly referenced by a plurality of jobs as an environmental variable to be referenced by said job.

According to yet another aspect of the present invention there is provided a management terminal for use in a job management system which controls execution of jobs according to a set job network and which allows setup for data transfer from a preceding job to a succeeding job, said management terminal comprising means for instructing to specify such that data can be transferred from said preceding job to said succeeding job by linking a standard output of said preceding job to a standard input of said succeeding job when setting said succeeding job in setup of said job network.

According to yet another aspect of the present invention there is provided a management terminal for use in a job management system which controls execution of jobs according to a set job network, said management terminal comprising means for instructing to specify an environmental variable to be commonly referenced by a plurality of jobs as an environmental variable referenced by said job.

According to yet another aspect of the present invention there is provided a computer program for job network setup in a job management system comprising a computer-executable code for controlling execution of said jobs according to a set job network, a computer-executable code for allowing setup for data transfer from a preceding job to a succeeding job, a computer-executable code for instructing to specify such that data can be transferred from said preceding job to said succeeding job by linking a standard output of said preceding job to a standard input of said succeeding job when setting said succeeding job in setup of said job network.

According to yet another aspect of the present invention there is provided a computer program for job network setup in a job management system which controls execution of jobs according to a set job network comprising a computer-executable code for controlling execution of jobs according to a set job network, and a computer-executable code for instructing to specify an environmental variable to be commonly referenced by a plurality of jobs as an environmental variable to be referenced by said job.

According to yet another aspect of the present invention there is provided a computer-readable medium storing a computer program for job network setup in a job management system comprising a computer-executable code for controlling execution of said jobs according to a set job network, a computer-executable code for allowing setup for data transfer from a preceding job to a succeeding job, a computer-executable code for instructing to specify such that data can be transferred from said preceding job to said succeeding job by linking a standard output of said preceding job to a standard input of said succeeding job when setting said succeeding job in setup of said job network.

According to yet another aspect of the present invention there is provided a computer-readable medium storing a computer program for job network setup in a job management system comprising a computer-executable code for controlling execution of jobs according to a set job network, and a computer-executable code for instructing to specify an environmental variable to be commonly referenced by a plurality of jobs as an environmental variable to be referenced by said job.

According to yet another aspect of the present invention there is provided a method for controlling a user interface in a job management system which controls execution of jobs according to a set job network and which allows setup for data transfer from a preceding job to a succeeding job, said method comprising enabling specifying said preceding job by selecting a standard input of said succeeding job such that data can be transferred from said preceding job to said succeeding job when setting said succeeding job in setup of said job network.

It is to be noted that other features of the present invention will become more apparent from the following descriptions of this specification and the accompanying drawings.

DETAILED DESCRIPTION OF THE INVENTION

The present invention will now be described in conjunction with embodiments thereof.

<Job Management System>

Figure 1:
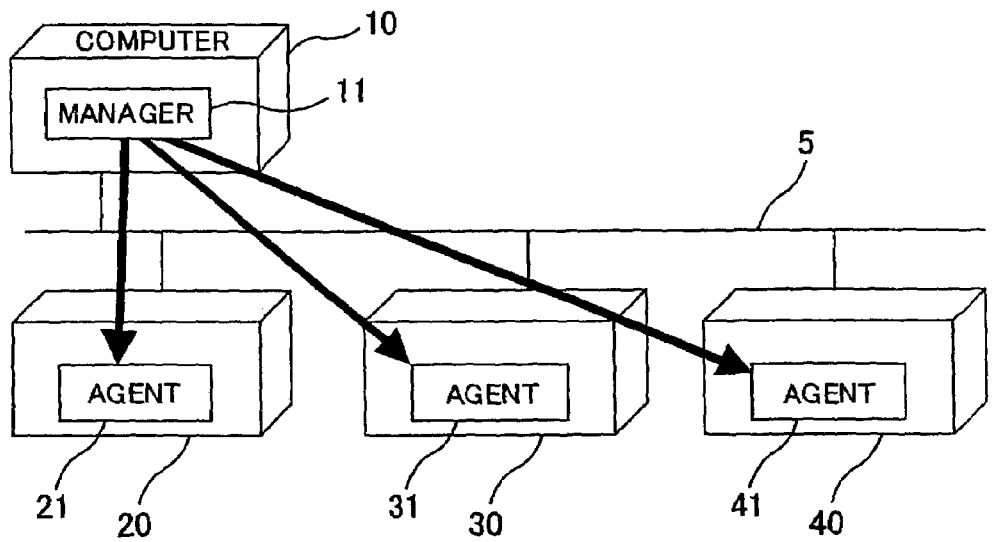
FIG. 1 illustrates the configuration of a computer system according to an embodiment of the present invention.

FIG. 1 illustrates the configuration of a computer system in which a job management system described as an embodiment of the present invention, runs. This system is configured to include the computers 10, 20, 30 and 40 connected over the network 5. An operating system runs in each of the computers 10, 20, 30 and 40, and the job management system executes jobs on the operating system according to a set job network.

The major functions available with this system are provided by a manager program (hereinafter referred to as "manager") 11 running in the computer 10 and agent programs (hereinafter referred to as "agents") 21, 31 and 41 respectively running in the computers 20, 30 and 40.

Of these programs the manager 11 handles tasks such as managing jobs and the job network, analyzing the job network, managing the job schedule, handling events and controls and monitors job execution and the job network. Additionally, the manager 11 has job network configuration information, entered by the user via a GUI-based user interface, stored in a database. This configuration information includes setup information about job execution sequence, job activation times and the like. The manager 11 monitors job execution statuses such as dates and times output by the computer 10's built-in timer and end of a preceding job, and when the activation time of a certain job, entered in the configuration information, comes, the manager 11 instructs, for example, the agent 21, 31 or 41 to execute that job. The agent 21, 31 or 41 executes the job according to a job execution request sent by the manager 11.

<Data Transfer>

Figure 2:
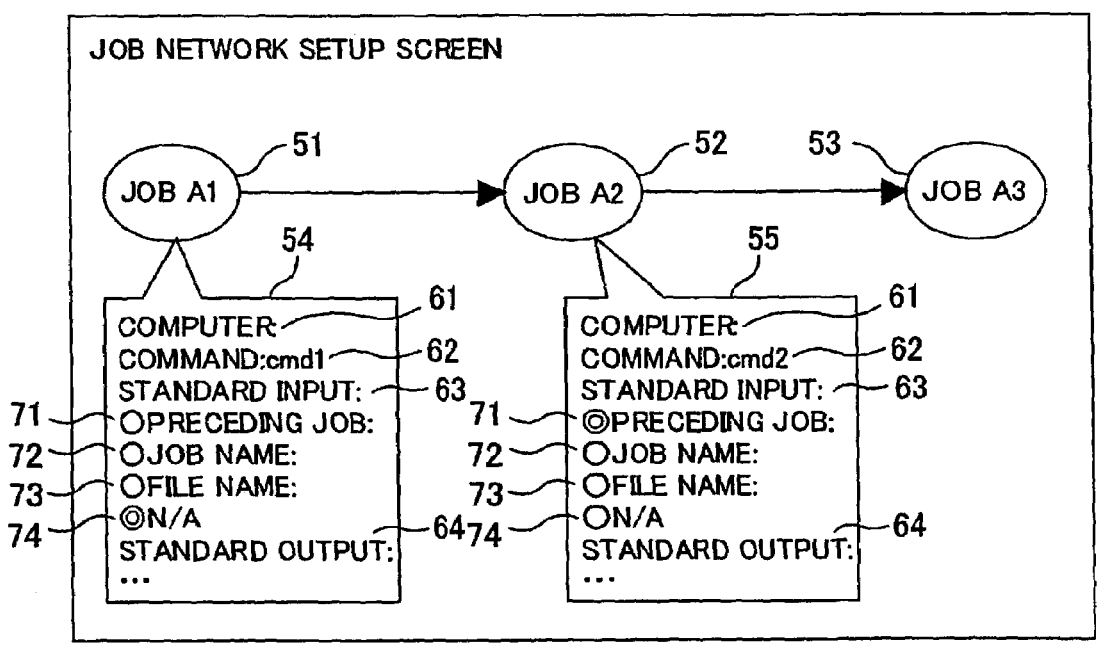
FIG. 2 illustrates a setup screen appearing on the management terminal's display of the job management system when job network's configuration information is set up according to an embodiment of the present invention.

FIG. 2 illustrates a GUI (Graphical User Interface)-based setup screen appearing on the management terminal's display of the job management system when job network's configuration information is set up. Note that the management terminal may take various forms as appropriate; for example, its functionality may be provided in the computers 10, 20, 30 and 40 themselves, it may be a computer connected to one of the computers 10, 20, 30 and 40 or it may be a separate computer, connected to the network 5, which is different from the computers 10, 20, 30 and 40.

The job network displayed in the setup screen in FIG. 2, is set up such that the jobs A1, A2 and A3 are executed in succession starting from the job A1. In this figure, properties setting fields 54 and 55 of the jobs A1 and A2 displayed in the form of a balloon from objects 51 and 52, corresponding respectively to the jobs A1 and A2, contain setup options 61 to 64 including "Computer", "Command", "Standard Input" and "Standard Output." Note that the properties setting fields 54 and 55 may be displayed in different windows. The identifier of the computer executing that job is set in the "Computer" setup option 61. The name of the command activated by this job is set in the "Command" setup option 62. The activation of the command creates a process on the operating system. Note that it is possible to include a plurality of processes in a single job.

The manner in which data is to be transferred from a preceding job is specified in the "Standard Input" setup option 63. Note that the user can select one of check boxes 71 through 74—"Preceding Job", "Job Name", "File Name" and "No"—in this "Standard Input" setup option 63.

Here, if the "Preceding Job" check box 71 is chosen, the preceding job from which data will be transferred is automatically determined from the job network configuration, and when "Preceding Job" is, for example, selected in the job A2's setting fields 54 and 55 in FIG. 2, the job A1 which is linked immediately before the job A2 will be the preceding job. On the other hand, if data is transferred from the job A1 to the job A3, the user selects the "Job Name" check box 72 and enters the name of the job from which data will be transferred in the entry box following ":." Note that data transfer between jobs during job execution is performed automatically by the job management system's function which will be discussed later. That is, if the user wishes to set up the job network such that data is transferred between jobs, he or she needs only to perform the setup tasks described above, thus ensuring substantially better user work efficiency than was previously available.

The user specifies the name of the file to be used as standard input when the "File Name" check box 73 is selected and if he or she wishes to explicitly specify a file from which data is to be transferred as was previously done. The user selects the "No" check box 74 if there is no need to transfer data. Note that a "Yes" check box may be provided for selection when it is necessary to transfer data.

As discussed above, the user needs only to select the "Preceding Job" check box 71 in the "Standard Output" setup option 63 if he or she wishes to transfer data between jobs. Note that the user needs only to select the "Job Name" check box 72 in the "Standard Output" setup option 63 and specify the name of the job from which data is to be transferred if he or she wishes to transfer data from a particular preceding job to a succeeding job and not from a job which is set up in the job network as the immediately preceding job. This eliminates the need for the user to explicitly specify a file name as was previously done, thus lightening user workload. Note that even if data communication over the network 5 is required as discussed later, the job management system will automatically handle data transmission, thus eliminating the need for the user to manually send data or schedule jobs for sending data and eventually taking much of the burden of setup for job-to-job data transfer off the user as compared with conventional job management systems. In particular, if the job network contains a large number of jobs and therefore data transfer setup must be performed for those many jobs, the user can efficiently set up the job network.

(Manager's Processing)

Figure 3:
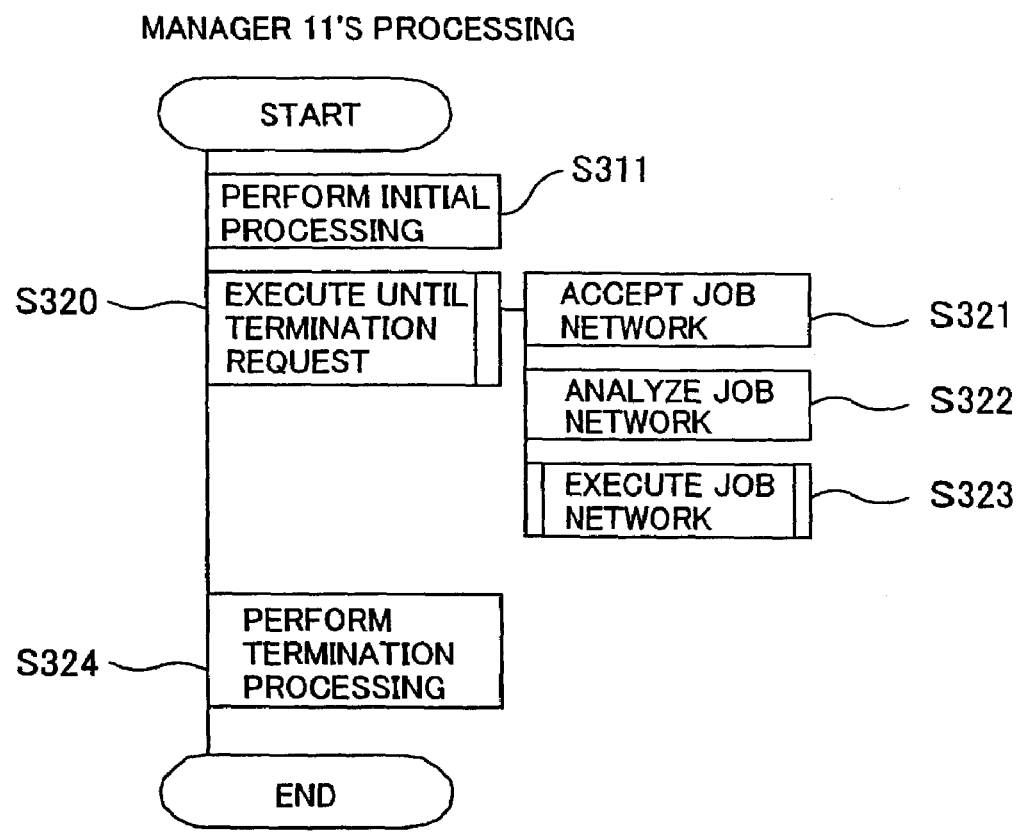
FIG. 3 illustrates the PAD describing the manager's processing according to an embodiment of the present invention.

Next, the job management system's processing during job network execution is described. FIG. 3 is the PAD illustrating the manager 11's processing at the time of job network execution. In executing a set job network, the manager 11 performs initial processing (S311) first including initialization of variables used and memory contents and then repeatedly executes processes—job network acceptance (S321)=>job network analysis (S322)=>job network execution (S323)—during a period (S320) until a termination-instructing interrupt is input. The manager 11 performs termination processing (S324) when an interrupt is input.

Figure 4:
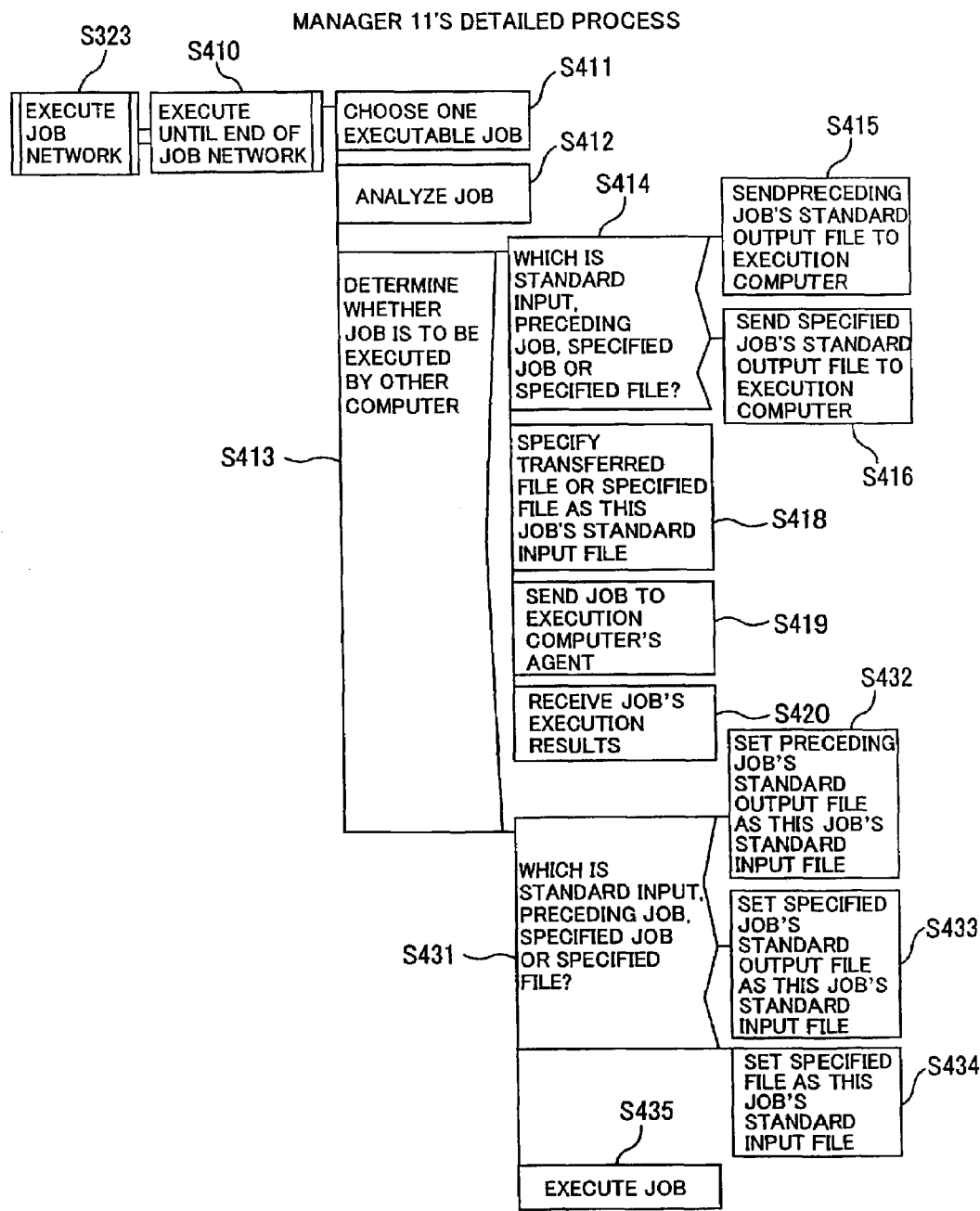
FIG. 4 illustrates the processing executed by the manager's job network according to an embodiment of the present invention.

The PAD shown in FIG. 4 represents the details of the job network execution (S323) handled by the manager 11 in FIG. 3. The manager 11 chooses one executable job (S411). Here, the executable job refers to a job, whose conditions for initiating execution such as end of the preceding job and event reception are satisfied, of all jobs waiting to be executed which are managed by the job management system. And, the manager 11 analyzes the information set up for the selected job (S412) and determines whether that job is to be executed by other computer or by the manager 11 itself (S413). Here, if the job should be executed by a different computer, the manager 11 checks which of the "Preceding Job" check box 71, the "Job Name" check box 72, the "File Name" check box 73 and the "No" check box 74 is selected in the setup information of that job. Here, if the "Preceding Job" check box 71 is selected (S414), the preceding job's standard output file is sent to the computer in which the job is to be executed (S415).

If the "Job Name" check box 72 is selected, a file in which the contents of the preceding job's standard output are written (hereinafter referred to as "standard output file") is sent to a computer executing that job (hereinafter referred to as "execution computer") (S416). Note that if the "File Name" check box 73 is selected, the contents of the preceding job's standard input are written in a file corresponding to that file name (hereinafter referred to as "specified file") and that file is sent to the execution computer.

Next, the job management system sends an execution instruction for the job, which is set up such that the contents of the standard output file or the specified file sent in (S415) or (S416) are used as the contents of the selected executable job's standard input, to the agent 21, 31 or 41 running in the execution computer (S418, S419). Note that this embodiment explains that the program and the data used for job execution are set up in the computers 10, 20, 30 and 40 at the time of execution of that job. After job execution by the agent 21, 31 or 41, the agent 21, 31 or 41 sends execution results to the manager 11 (S420).

If the job selected in (S413) is that to be executed by the manager 11 itself, the manager 11 checks which of the "Preceding Job" check box 71, the "Job Name" check box 72, the "File Name" check box 73 and the "No" check box 74 is selected in the setup information of that job (S431). Here, if the "Preceding Job" check box 71 is selected, the job management system sets the contents of the preceding job's standard output file as the contents of the job's standard input (S432). Note that if the "Job Name" check box 72 is selected, the job management system sets the contents of the preceding job's standard output file as the contents of the job's standard input (S433). Note also that if the "File Name" check box 73 is selected, the job management system sets the contents of the specified file as the contents of the job's standard input (S434). Then the manager 11 executes the selected job (S435) following the processing in (S431).

(Agents' Processing)

Figure 5:
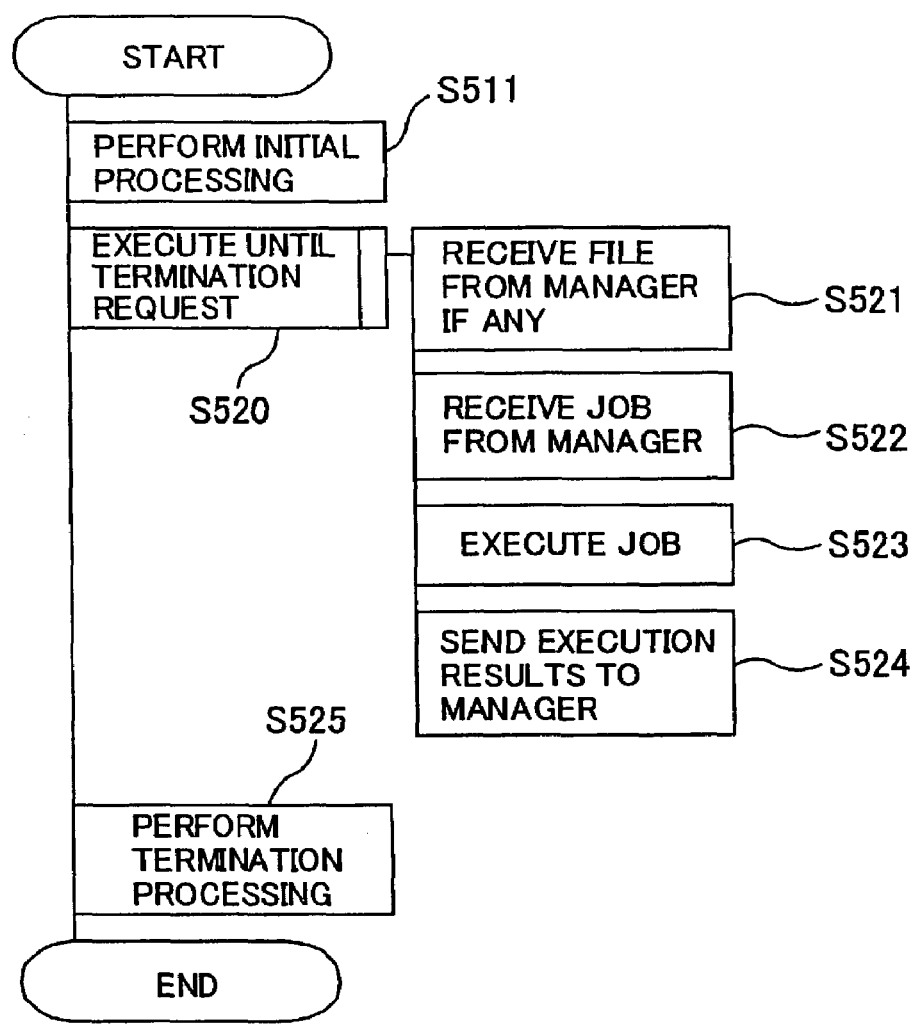
FIG. 5 illustrates the PAD describing the agent's processing according to an embodiment of the present invention.

Next, the processing by the agents 21, 31 and 41 is described in accordance with the PAD shown in FIG. 5. The agents 21, 31 and 41 running in the execution computers perform initial processing (S511) first including initialization of variables used and memory contents and then repeatedly execute processes—reception of file from the manager 11 (S521)=>reception of job execution request from the manager 11 (S522)=>job execution (S523)=>transmission of job execution results to the manager 11 (S524)—during a period (S520) until a termination-instructing interrupt is input. And, the agents 21, 31 and 41 perform termination processing (S525) when an interrupt is input.

Note that if a job executed by the agent 21, 31 or 41 is the preceding job set up such that data is to be transferred from that job to a succeeding job, the agent 21, 31 or 41 sends a standard output file, in which the contents of the preceding job's standard output are written, to the manager 11 via the network 5 after execution of the preceding job. Note that the standard output file thus sent from the agent 21, 31 or 41 is sent by the manager 11 in the processing (S415) or (S416) to the agent 21, 31 or 41 which will be executing the succeeding job.

Incidentally, in the embodiment discussed above, data to be transferred from a preceding job to a succeeding job is sent to the computer 10 in which the manager 11 runs once and then sent from the manager 11 to the computer which will execute the succeeding job. That is, data to be transferred from preceding jobs executed by all the agents 21, 31 and 41 to succeeding jobs are collected in the manager 11 in this arrangement; however, it is possible to send data from computers executing preceding jobs directly to computers executing succeeding jobs by bypassing the manager 11.

In that case, when the manager 11 sends a job execution instruction to the agent 21, 31 or 41 running in the execution computer (S419), for example, an instruction requesting the agent to send the data to the computer, which will execute the succeeding job, after execution of that job, is attached to that execution instruction. Then the agent 21, 31 or 41 sends the data to the computer, which will execute the succeeding job, after execution of the preceding job. Such direct data transmission takes the load associated with data transmission to the computer 10 off the network 5, thus ensuring efficient network utilization.

Note that if a preceding and its succeeding jobs are executed in the same computer, data is transferred between these jobs, for example, through file copying or file name transfer.

<Environmental Variables>

Figure 6:
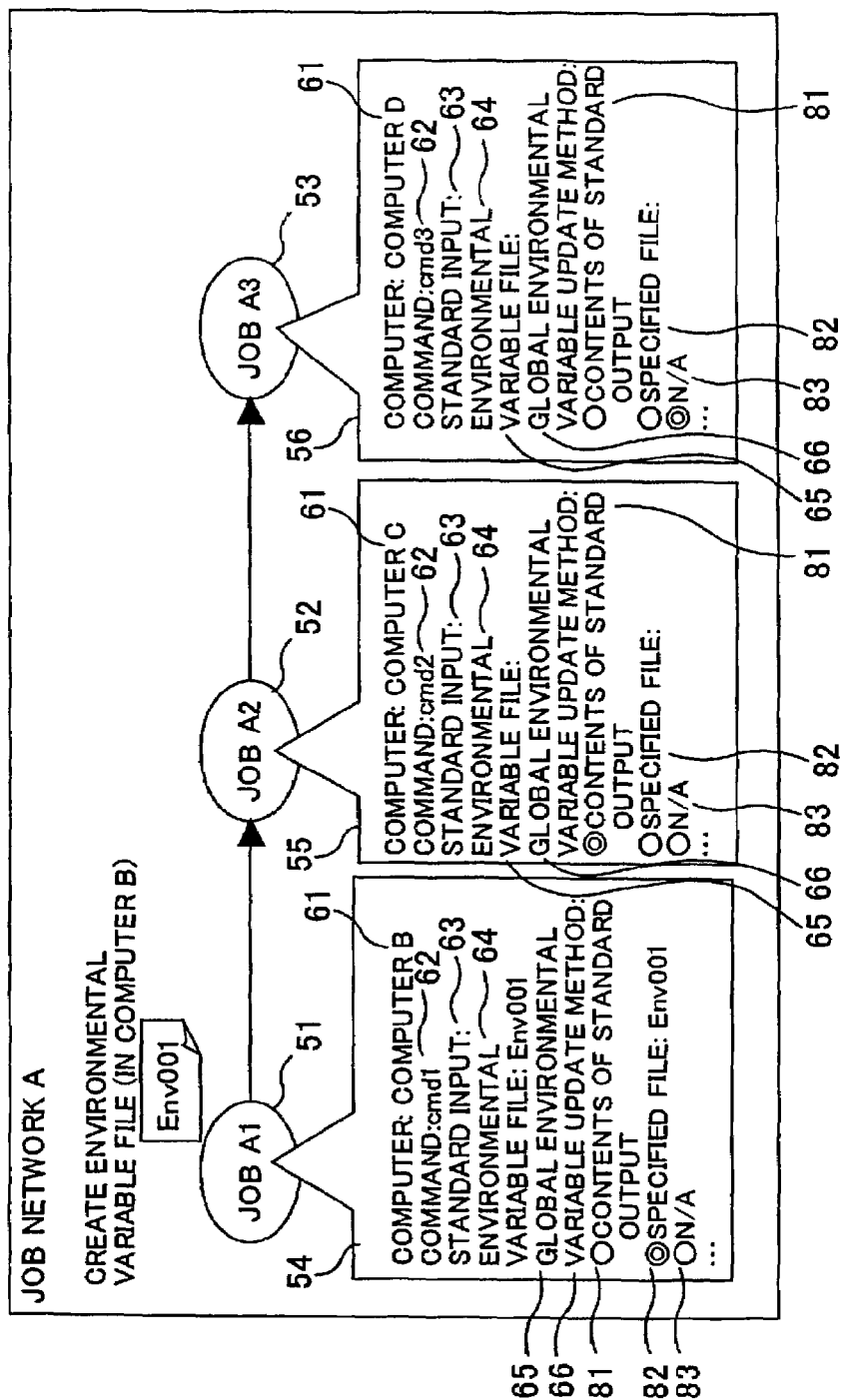
FIG. 6 illustrates a setup screen appearing on the management terminal's display of the job management system when job network's configuration information is set up according to an embodiment of the present invention.

FIG. 6 illustrates a GUI-based setup screen appearing on the management terminal's display when job network's configuration information is set up. The job network, displayed in the setup screen in FIG. 6, is set up such that the jobs A1, A2 and A3 are executed in succession starting from the job A1. The properties setting fields 54, 55 and 56 of the jobs A1, A2 and A3 displayed in the form of a balloon from the objects 51, 52 and 53, corresponding respectively to the jobs A1, A2 and A3, contain setup options 61 to 66—"Computer", "Command", "Standard Input", "Standard Output", "Environmental Variable File" and "Global Environmental Variable Update Method." Note that the properties setting fields 54, 55 and 56 may be displayed in different windows. Of these the descriptions of the "Computer" setup option 61, the "Command" setup option 62 and the "Standard Output" setup option 63 are omitted as they are the same as those given earlier.

The "Environmental Variable File" setup option 65 and the "Global Environmental Variable Update Method" setup option 66 relate to global environmental variables—environmental variables shared among jobs constituting the job network. The name of the file, in which environmental variables' settings are written during exchange of environmental variables between jobs, is specified in the "Environmental Variable File" setup option 65.

The user can specify a global environmental variable update method by selecting one of the update methods in the check boxes of the "Global Environmental Variable Update Method" setup option 66. The properties setting fields 54, 55 and 56 allow selection of one of the check boxes 81 to 83—"Contents of Standard Output", "Specified File" and "No"—as global environmental variable update method.

Job management system's processing in relation to each of the options are described. If the "Specified File" check box 82 is selected during setup of the job A1 in the job network, the explicitly specified local file will be used as output destination of global environmental variables. Note that if the "Specified File" check box 82 is selected, the user needs to make available a file having the name specified in this check box on the operating system of the computer executing that job prior to job execution. After execution of the job A1, global environmental variables' settings after execution of the job A1 are set in the specified file under the name of "Env001."

Global environmental variables are, for example, set as follows:

COMPANY_NAME=Hitachi
PRODUCT_NAME=HiCommand
DB_NAME=HiRDB
BACKUP_ID=32695

Note that in this case since the "Contents of Standard Output" check box 81 is selected as global environmental variable update method in the job A2 setup, global environmental variables settings are updated as shown below and the job A3 is executed based on these settings if the following updated environmental variables' settings are output to the standard output as a result of execution of the Job A2 (the BACKUP_ID setting is changed in this example):

COMPANY_NAME=Hitachi
PRODUCT_NAME=HiCommand
DB_NAME=HiRDB
BACKUP_ID=32700

Note that when the "No" check box 83 is selected as the update method, the global environmental variables' settings are not updated even if that job is executed.

The properties setting fields 54, 55 and 56 may be changed such that whether to reference global environmental variables can be specified in these properties setting fields. Note that local environmental variables normally take precedence. This ensures that global environmental variables are referenced by only necessary jobs, thus allowing, for example, only succeeding jobs to reference global environmental variables. Additionally, changes may be made such that whether to reference global environmental variables can be specified for each job network. In this case, an instance of global environmental variables is created on the manager for each job network.

Changes may also be made such that only those jobs belonging to the same job network can commonly reference environmental variables. Further, changes may be made such that only those jobs which succeed a particular preceding job can commonly reference environmental variables.

Note that, when a nested job network is set up, changes may be made such that child job networks contained in a parent job network reference global environmental variables' settings referenced by their parent job network by default and that they reference unique global environmental variables within the child job networks if so specified by the user. Note also that if an environmental variable having the same name exists among global and local environmental variables, changes may be made such that the user can specify which of these variables should be used preferentially.

(Manager's Processing)

Figure 7:
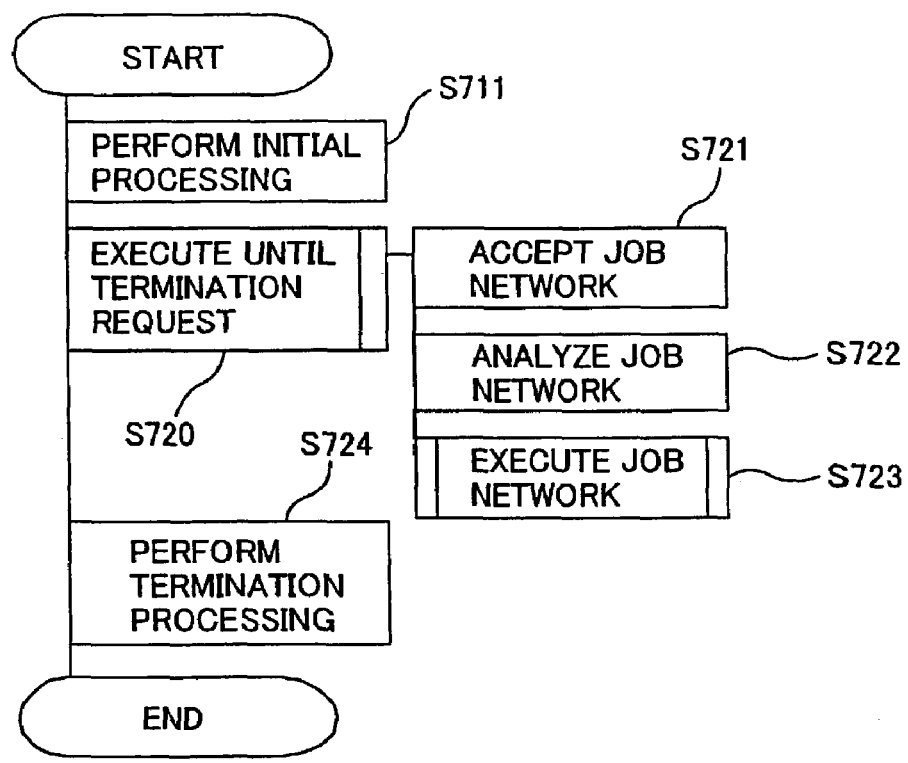
FIG. 7 illustrates the PAD describing the manager's processing according to an embodiment of the present invention.

The processing by the manager 11 running in the computer 10 is described in accordance with the PAD shown in FIG. 7. In executing a set job network, the manager 11 performs initial processing (S711) first including initialization of variables used and memory contents and then repeatedly executes processes—job network acceptance (S721)=>job network analysis (S722) =>job network execution (S723)—during a period (S720) until a termination-instructing interrupt is input. The manager 11 performs termination processing (S724) when an interrupt is input.

Figure 8:
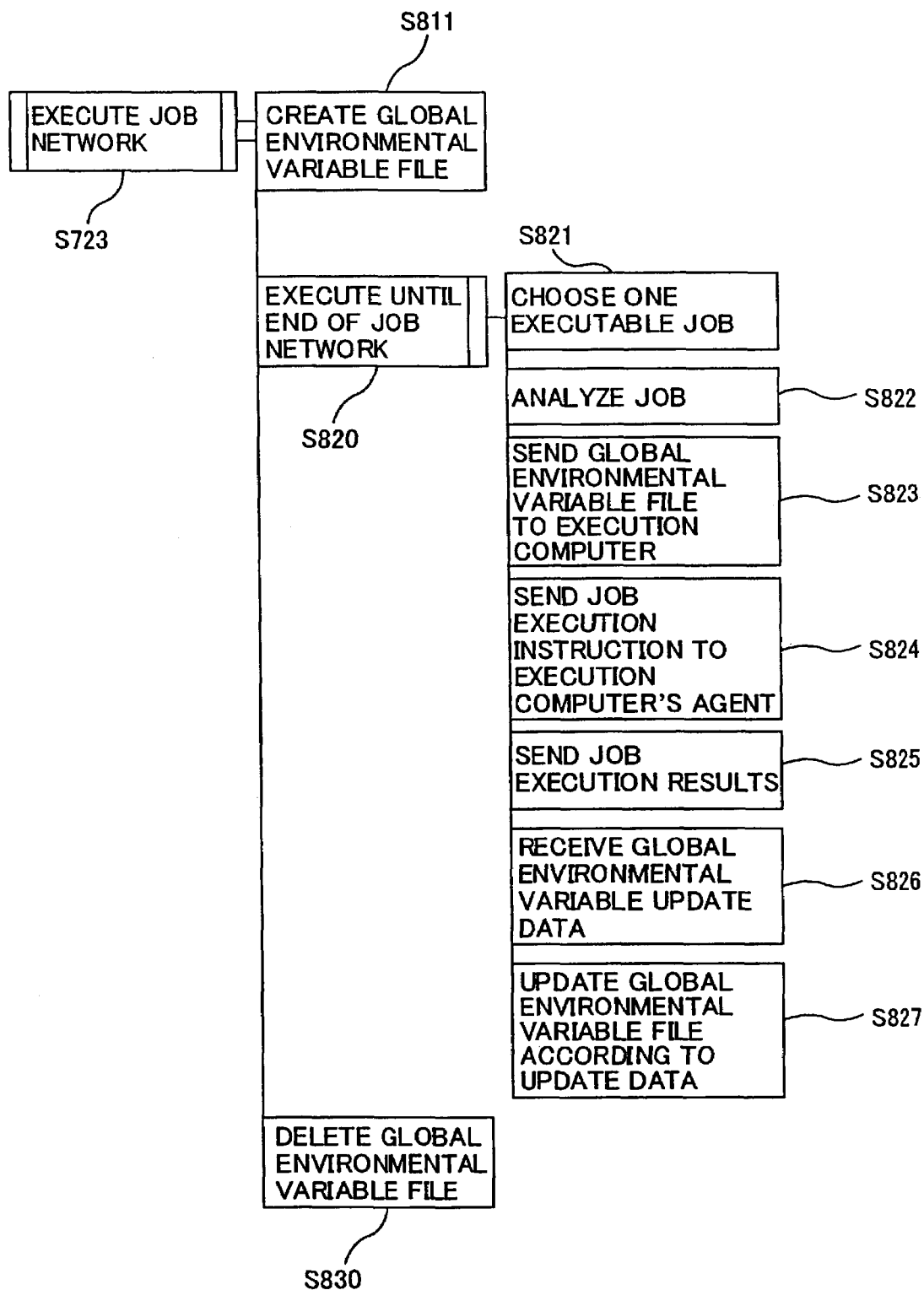
FIG. 8 illustrates the processing executed by the manager's job network according to an embodiment of the present invention.

The job network execution (S723) of the manager 11 shown in FIG. 7 is described in detail by referring to the PAD in FIG. 8. The manager 11 creates on the operating system a file (hereinafter referred to as "global environmental variable file") in which global environmental variables are written (S811).

Note that the manager 11 creates a new global environmental variable file each time it executes a job network. Note also that global environmental variables are set up by default such that they are shared among jobs constituting a single job network. Note also that a storage area may be reserved for global environmental variables within a memory space of the computer 10 in which the manager 11 runs such that global environmental variables' settings in memory are output as necessary to a global environmental variable file made available on a storage device such as disk drive.

Next, the manager 11 chooses one executable job (S821). After job selection, the manager 11 analyzes the information set up for that job (S822). The manager 11 sends a global environmental variable file to a computer executing the selected job (hereinafter referred to as "execution computer") (S823). Note that changes may be made such that the manager 11 does not send the global environmental variable file if this file is empty.

Next, the manager 11 sends an execution instruction about the selected job to the agent 21, 31 or 41 of the execution computer (S824). Note that this execution instruction contains a direction requesting that the global environmental variable file sent in (S823) be set as the environmental variable file for the job. Note also that although this instruction may also contain a direction requesting that a local environmental variable file be set as the environmental variable file for the job, changes may be made in this case such that both global and local environmental variable files are referenced by the job or that only one of the files is referenced preferentially. Note that when both files are referenced by the job and if these files contain an environmental variable having the same name, changes may be made such that either of these variables is used preferentially.

As discussed later, when the agent 21, 31 or 41 running in the execution computer receives an execution instruction, it executes that job. After execution, the agent 21, 31 or 41 sends execution results to the manager 11, and the manager 11 receives execution results from the agent 21, 31 or 41 (S825).

Next, the manager 11 receives data for updating global environmental variables (hereinafter referred to as "global environmental variable update data") from the agent 21, 31 or 41 (S826) through the processing in (S1030) discussed later and updates the contents of the global environmental variable file according to the data contents (S827). Note that if there is no update data, the global environmental variable file is not updated. Note also that if the "Contents of Standard Output" 81 is selected in the properties setting fields 54, 55 and 56, the contents of standard output are sent to the manager 11 as update data for global environmental variables and the manager 11 updates global environmental variables' settings according to the update data contents. On the other hand, if a file is specified in the properties setting fields 54, 55 and 56, global environmental variable update data is created according to the contents of that file, that update data is sent to the manager 11 and the manager 11 updates the global environmental variables' settings based on the contents of that update data.

When all job network processing are completed, the manager 11 deletes (or disables) the global environmental variable file if necessary (S830).

(Agents' Processing)

Figure 9:
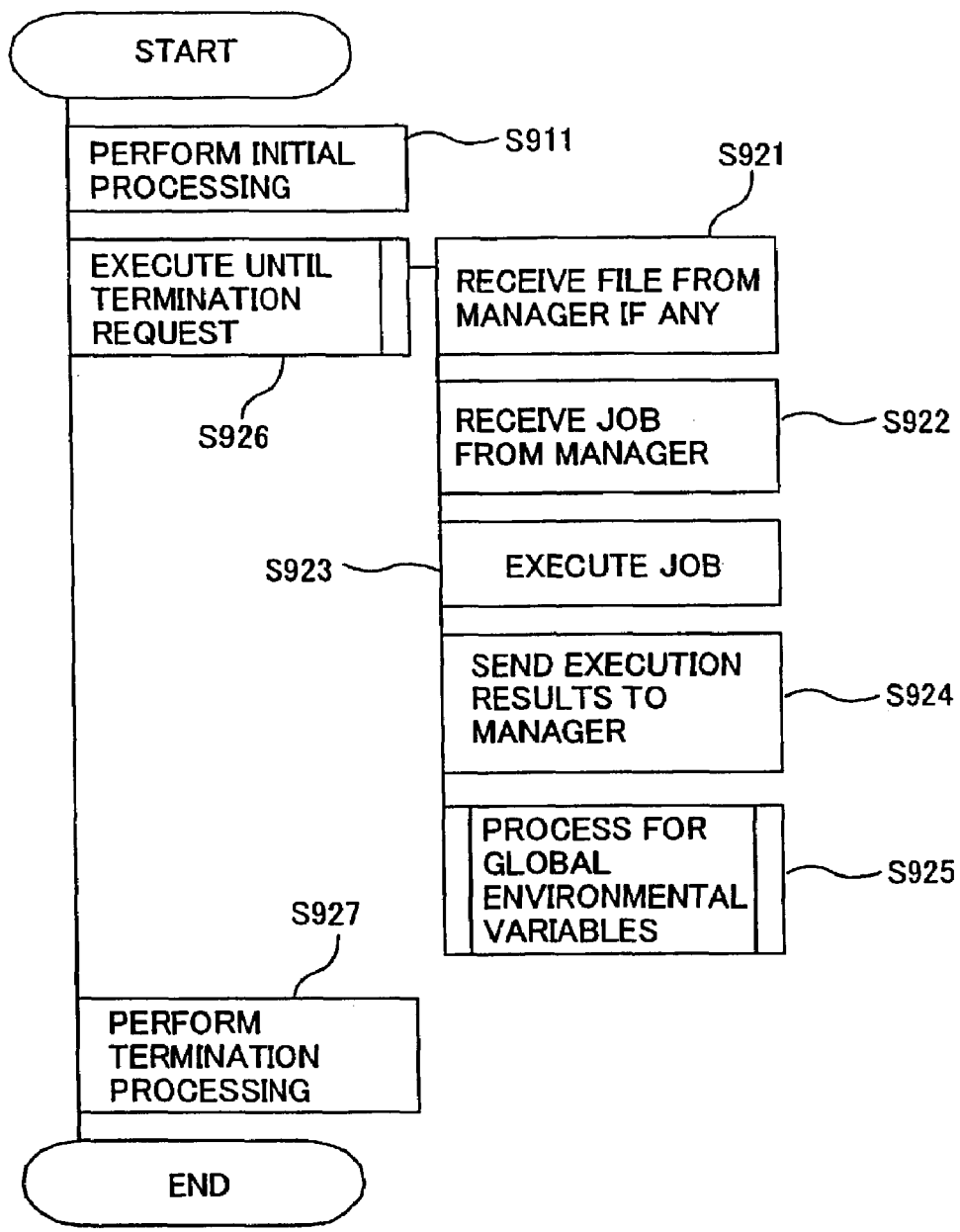
FIG. 9 illustrates the PAD describing the agents' processing according to an embodiment of the present invention.

Next, the processing by the agents 21, 31 and 41 is described in accordance with the PAD shown in FIG. 9. The agents 21, 31 and 41 running in the execution computers perform initial processing (S911) first including initialization of variables used and memory contents and then repeatedly execute processes—reception of file from the manager 11 (S921)=>reception of job execution request from the manager 11 (S922)=>job execution (S923)=>transmission of job execution results to the manager 11 (S924)=>processing of global environmental variables (S925)—during a period (S926) until a termination-instructing interrupt is input. And, the agents 21, 31 and 41 perform termination processing (S927) when an interrupt is input.

Figure 10:
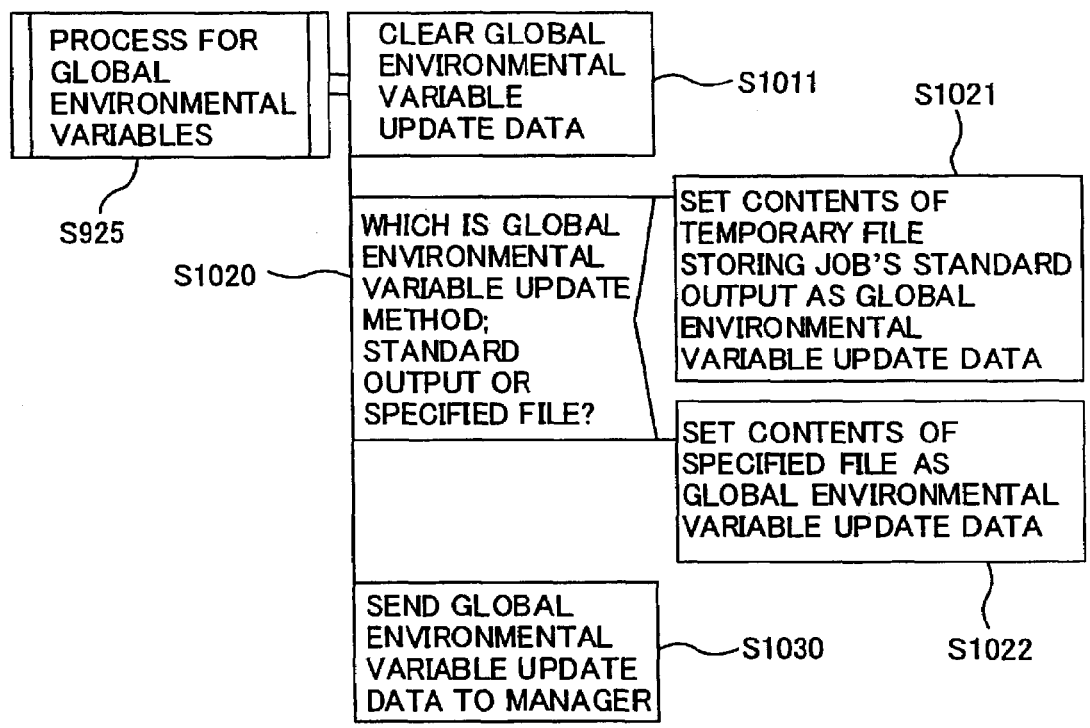
FIG. 10 illustrates the PAD describing processing of global environmental variables according to an embodiment of the present invention.

Processing of global environmental variables (S925) in FIG. 9 is described in detail along with the PAD in FIG. 10. The agents 21, 31 and 41 running in the execution computers clear already existing global environmental variable update data (S1011). Here, if the "Contents of Standard Output" check box 81 is selected as global environmental variable update method (S1020), the agents 21, 31 and 41 running in the execution computers write the contents of standard output in a temporary file and set the contents of that file as global environmental variable update data (S1021). Note that if there is no job's standard output, an arrangement may be used such that no update data is set up (S1022).

On the other hand, if the "Specified File" check box 82 is selected as global environmental variable update method, the contents of the specified file are set as global environmental variable update data (S1022). And, the agents 21, 31 and 41 running in the execution computers send the global environmental variable update data set up as described above to the manager 11 (S1030). Note that changes may be made such that global environmental variable update data is set by finding the difference between global environmental variables received by the agents and those specified by the job.

Figure 11:
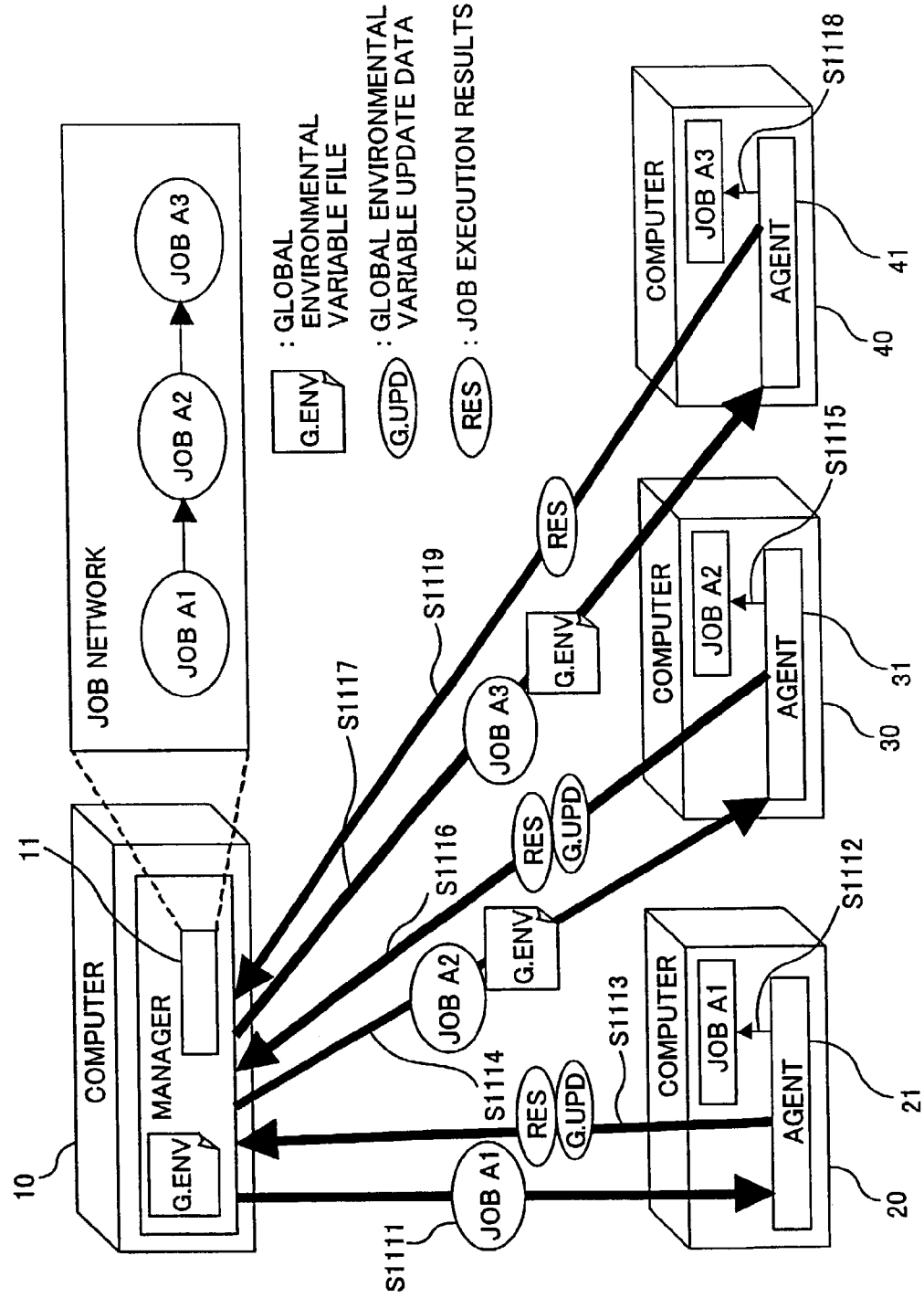
FIG. 11 illustrates an arrangement in which global environmental variables are shared among jobs according to an embodiment of the present invention.
Figure 12:
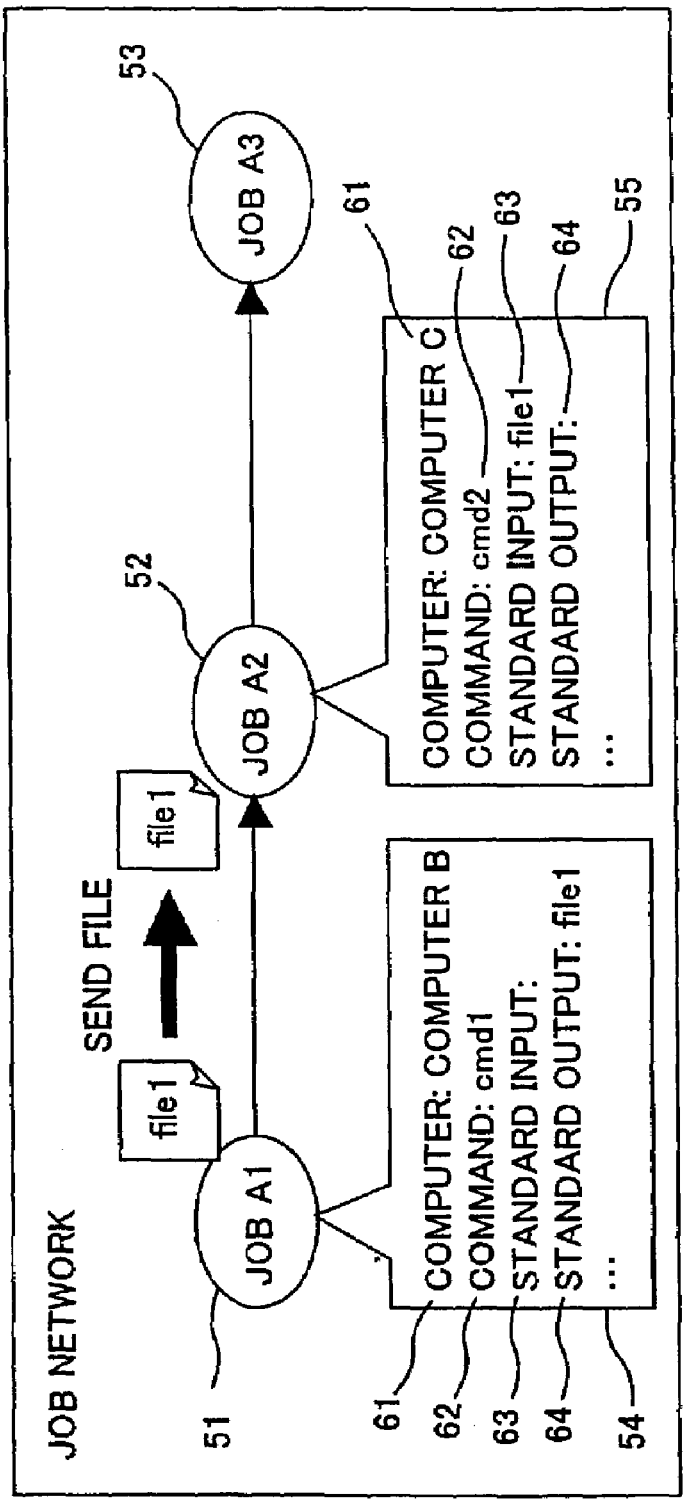
FIG. 12 illustrates a setup screen of the job network.
Figure 13:
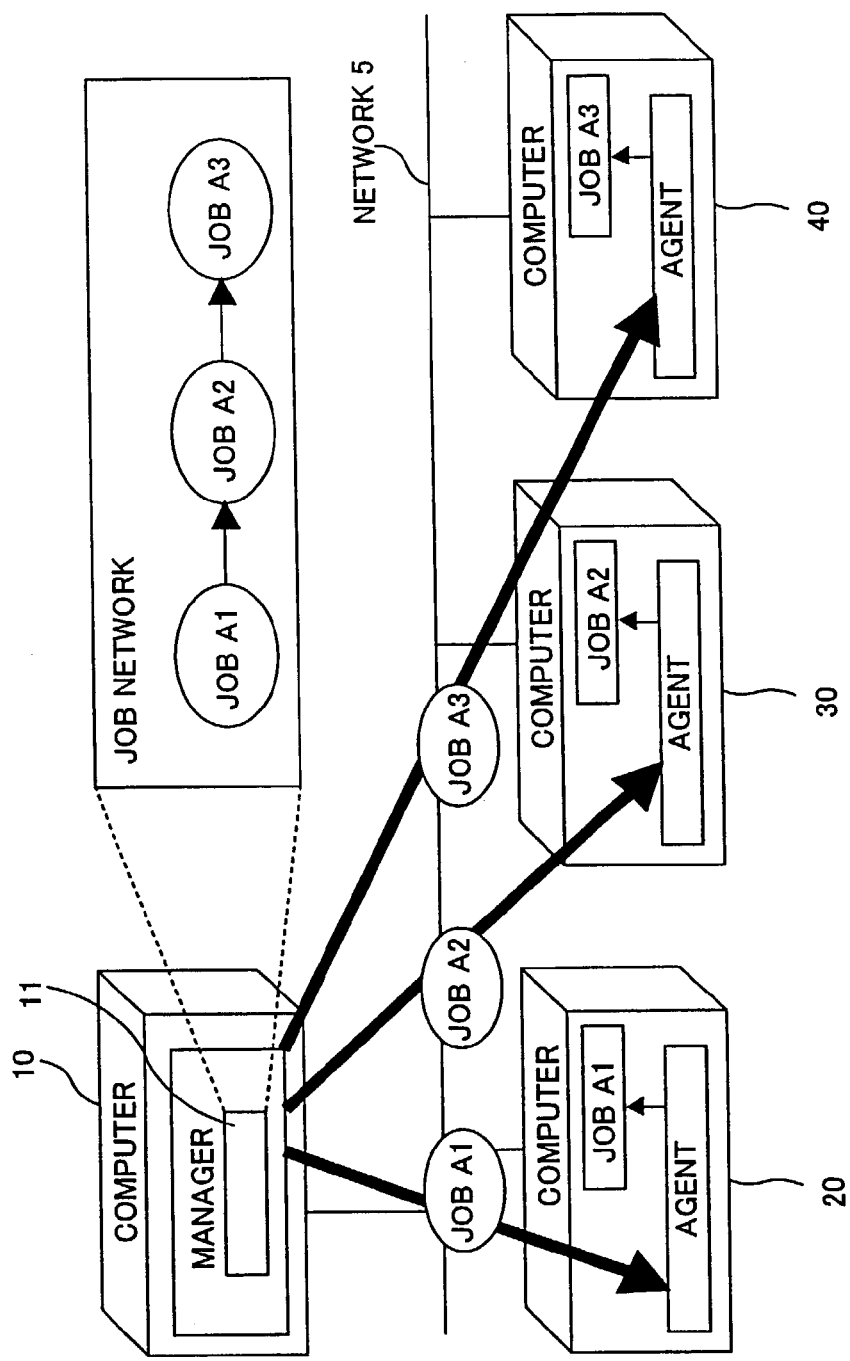
FIG. 13 illustrates an example of job management system operating environment in which a plurality of computers are connected over a network.
Figure 14:
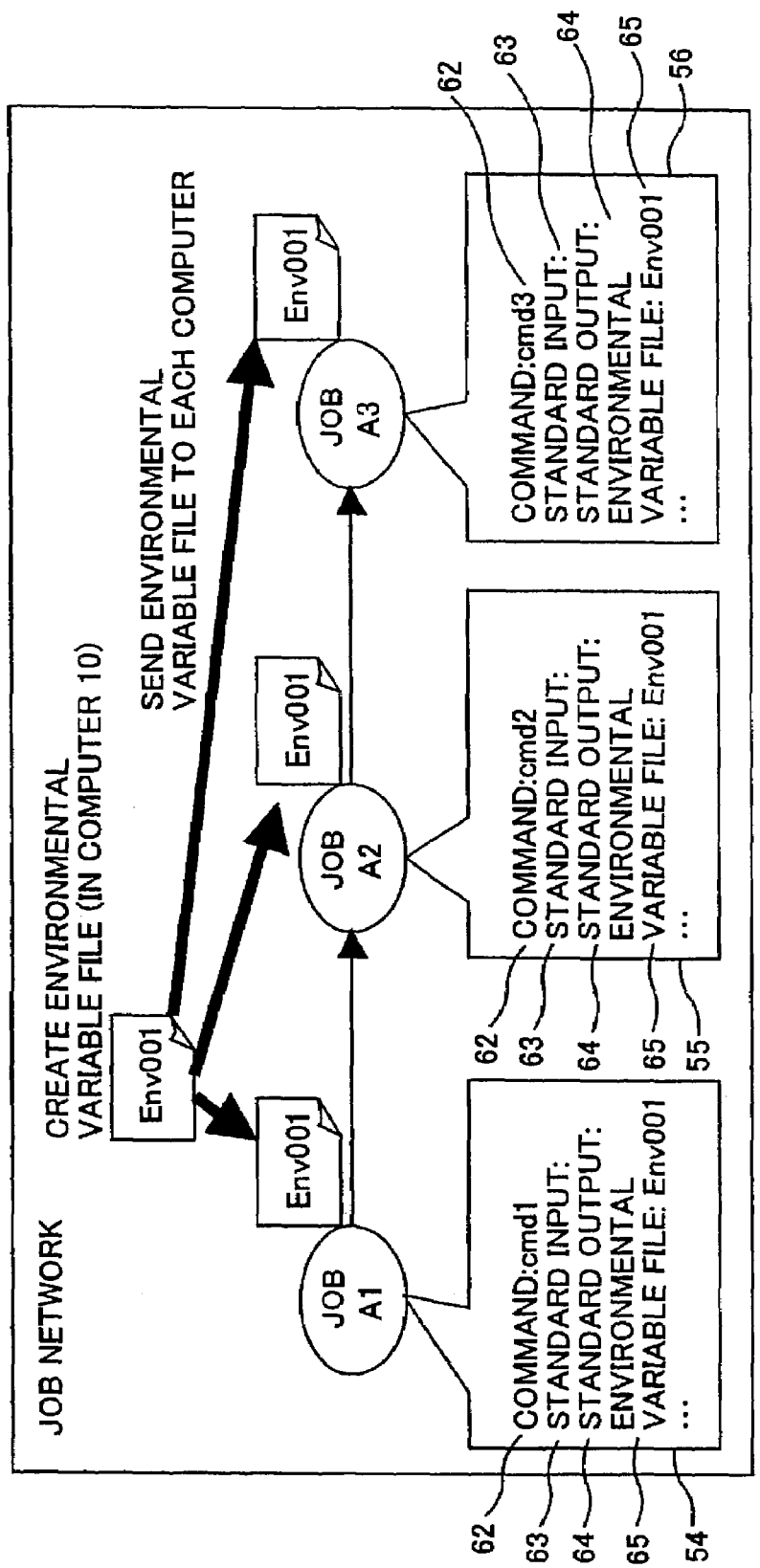
FIG. 14 illustrates the procedure for setting up environmental variables in individual computers.

The arrangement which allows sharing of global environmental variables among jobs as discussed above is described more specifically by referring to FIG. 11. The manager 11 running in the computer 10 sends an execution instruction for the job A1 to the agent 21 running in the computer 20 (S1111). When the agent 21 receives this execution instruction, this agent executes the job A1 (S1112). After execution of the job A1, the agent 21 sends execution results of the job A1 and the global environmental variable update data defined in "Env001" to the computer 10 (S1113). Initial values of global environmental variables are, for example, set by the computer 10 in which the manager is executed.

When the manager 11 receives execution results of the job A1 and the global environmental variable update data, it updates global environmental variables' settings according to the received global environmental variable update data and sends the updated global environmental variables' settings and an execution instruction for the job A2 to the computer 30 (S1114). When the agent 31 running in the computer 30 receives this execution instruction, this agent executes the job A2 (S1115). After execution of the job A2, the agent 31 sends execution results of the job A2 and the global environmental variable update data to the computer 10.

When the manager 11 receives execution results of the job A2 and the global environmental variable update data, it updates global environmental variables' settings according to the received global environmental variable update data and sends the updated global environmental variables' settings and an execution instruction for the job A3 to the computer 40 (S1117). When the agent 41 running in the computer 40 receives this execution instruction, this agent executes the job A3 (S1118). After execution of the job A3, the agent 41 sends execution results of the job A3 to the computer 10 (S1119).

In the embodiment, incidentally, global environmental variable update data is sent once to the computer 10 in which the manager 11 runs, and the manager 11 sends that data indirectly to the computer executing the succeeding job; however, it is possible to ensure that global environmental variable update data is sent directly from the computer executing the preceding job to the computer executing the succeeding job. In this case, when the manager 11 sends a job execution instruction to the agent 21, 31 or 41 running in the execution computer (S824), for example, it attaches a direction requesting the agent to send the data to the computer, which will run the succeeding job, after execution of that job to that execution direction. On the other hand, the agent 21, 31 or 41 sends global environmental variable update data to the computer executing the succeeding job after job execution, and the agent 21, 31 or 41 which receives the global environmental variable update data updates, based on that data, global environmental variables' settings which will be referenced by the succeeding job.

Although the network setup method and the like in the job management system according to the present invention have been described through several embodiments thereof, these embodiments are intended for easy understanding of the present invention and are not intended to limit the present invention. The present invention could be changed or modified without departing from its spirit and naturally includes its equivalents.

It is to be noted that the job management system's functions described above do not represent all the functions of the job management system and that the job management system may be provided with various other publicly known functions to suit the form of system applied such as execution control function through job network scheduling, repeated execution control, job execution activation function through detection of some event, GUI control, communication function via the network 5 and queuing function for job execution management in addition to those described above.

The embodiments discussed above explain about the case in which the job management system runs in the computers 10, 20, 30 and 40 connected via the network 5, however, this invention may be applied to the configuration in which all of the manager 11 and the agents 21, 31 and 41 run in a single computer.

The present invention ensures efficient setup of job networks.

Although the present invention has been set forth hereinabove through illustrative embodiments thereof, it will be obvious to those skilled in the art that this invention can variously be changed or modified and none of such variants and modifications or represents departure from the spirit of the present invention. Consequently, all such variants and modifications are to be construed as being included within the scope of the present invention.

What is claimed is:

1. A method for executing a job network in a job management system which controls execution of jobs according to said job network and which allows setup for data transfer from a preceding job to a succeeding job, said method comprising:
    displaying a screen for specifying a file name or a job name of said preceding job for a standard input of said succeeding job upon setting said succeeding job in configuration with said job network;
    executing said preceding job according to said job network;
    writing content of a standard output of said preceding job to a standard output file;
    inputting content of a specified file corresponding to said file name to said standard input of said succeeding job if said file name is specified for said standard input;
    inputting content of said standard output file of said preceding job corresponding to said job name to said standard input of said succeeding job if said job name is specified for said standard input, wherein said job network is set up such that said preceding job is executed by a first computer and that said succeeding job is executed by a second computer which is connected communicably to said first computer, and wherein said first computer writes said standard output of said preceding job to said standard output file;
    sending by said first computer contents of said standard output file of said preceding job corresponding to said job name to a third computer which is connected communicably to said first computer and said second computer if said job name is specified for said standard input of said succeeding job;
    sending by said first computer contents of said standard output file corresponding to said file name to said third computer if said file name is specified for said standard input of said succeeding job;
    receiving by said third computer said contents of said standard output file or said standard output of said preceding job and sending them to said second computer; and
    receiving by said second computer said contents of said standard output file or said standard output of said preceding job and inputting said contents of said standard output file or said standard output to said standard input of said succeeding job.

2. A method for executing a job network in a job management system which controls execution of jobs according to said job network, said method comprising:
    displaying a screen for specifying a file name or a standard output of a preceding job for an environmental variable referenced in common by a succeeding job;
    executing said preceding job according to said job network;
    writing content of a standard output of said preceding job to a temporary file;

updating said environmental variable according to content of a specified file corresponding to said file name if said file name is specified for said environmental variable;

updating said environmental variable according to content of said temporary file if said standard output of said preceding job is specified for said environmental variable, wherein a first computer executes said preceding job and writes said content of said standard output to said temporary file, and a second computer which is connected communicably to said first computer executes said succeeding job;

sending by said first computer said content of said temporary file to a third computer which is connected communicably to said first computer and said second computer if said standard output of said preceding job is specified for said environmental variable;

sending by said first computer said content of said specified file corresponding to said file name to said third computer if said file name is specified for said environmental variable;

receiving by said third computer said content of said specified file or temporary file and sending it to said second computer; and receiving by said second computer said content of said specified file or temporary file and updating said environmental variable according to said content of said specified file or temporary file.

* * * * *